United States Patent [19]
Ziemer et al.

[11] Patent Number: 4,710,208
[45] Date of Patent: Dec. 1, 1987

[54] SUSPENDABLE MODULAR FRAME ARRANGEMENT FOR CLEAN ROOM CEILINGS HAVING A FLUID SEAL

[75] Inventors: Wolf Ziemer, Berlin; Fritz Neubert, Kissing; Wilhelm Hölle, Münzenberg, all of Fed. Rep. of Germany

[73] Assignee: Fläkt AB, Nacka, Sweden

[21] Appl. No.: 814,227

[22] Filed: Dec. 27, 1985

[30] Foreign Application Priority Data

Dec. 28, 1984 [DE] Fed. Rep. of Germany ....... 3447901

[51] Int. Cl.$^4$ ............................................. B01D 46/00
[52] U.S. Cl. ....................... 55/355; 55/484; 52/484; 52/665; 403/174; 403/205; 403/403
[58] Field of Search ................. 55/355, 484; 52/484, 52/665, 737, 738; 98/40.05, 40.07, 40.1; 403/205, 403, 295, 174, 178

[56] References Cited

U.S. PATENT DOCUMENTS

| | | | |
|---|---|---|---|
| 3,471,981 | 10/1969 | Segil et al. | 52/484 X |
| 3,685,235 | 8/1972 | Lang | 52/484 X |
| 3,750,374 | 8/1973 | Neumann | 55/484 |
| 3,848,385 | 11/1974 | Thompson | 52/484 |
| 4,019,300 | 4/1977 | Sauer et al. | 52/484 X |
| 4,081,931 | 4/1978 | Miyoshi | 52/484 X |
| 4,233,044 | 11/1980 | Allan | 55/355 |
| 4,276,731 | 7/1981 | Henggeler et al. | 52/484 |
| 4,438,613 | 3/1984 | Hintsa et al. | 52/484 |
| 4,545,793 | 10/1985 | Shuler | 55/355 |

FOREIGN PATENT DOCUMENTS

0116772 8/1984 European Pat. Off. .

OTHER PUBLICATIONS

"Astro/Gel ® Modular Ceiling Grid System for Clean Rooms", American Air Filter, an Allis-Chalmers Company, Louisville, Kentucky, CAD-1-165, Feb. 1984.

*Primary Examiner*—Harold Joyce
*Attorney, Agent, or Firm*—Dann, Dorfman, Herrell and Skillman

[57] ABSTRACT

A modular frame arrangement suspendable from the ceiling of a room is proposed for receiving filters having fluid seals for clean room ceilings, which consists of structural rails having U-section channels for receiving the fluid, the rails being provided with a central web. Lying parallel to the ceiling, the webs of the rails and the central webs are constructed as hollow sections, the hollow section of the web being formed of two hollow chambers and a T-section groove lying between these hollow chambers. For connection of the rails, connection members are provided which have a square central part and integral arms offset in height at the lower side. The connection members are inserted with their arms in the rails so that the respective U-section channels are extended around the corner.

17 Claims, 7 Drawing Figures

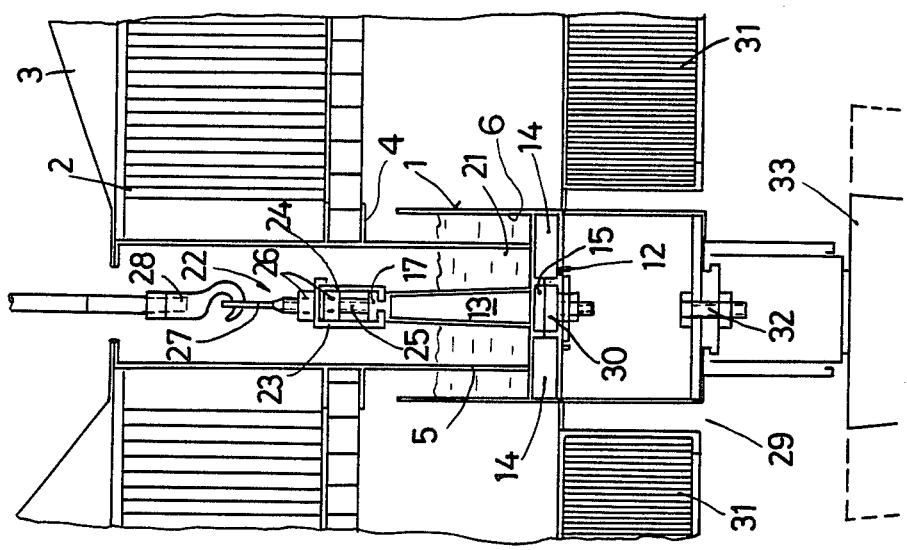
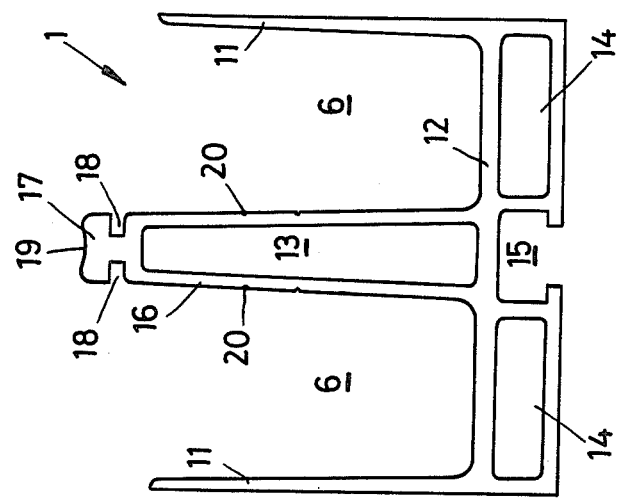
Fig. 3
Fig. 2

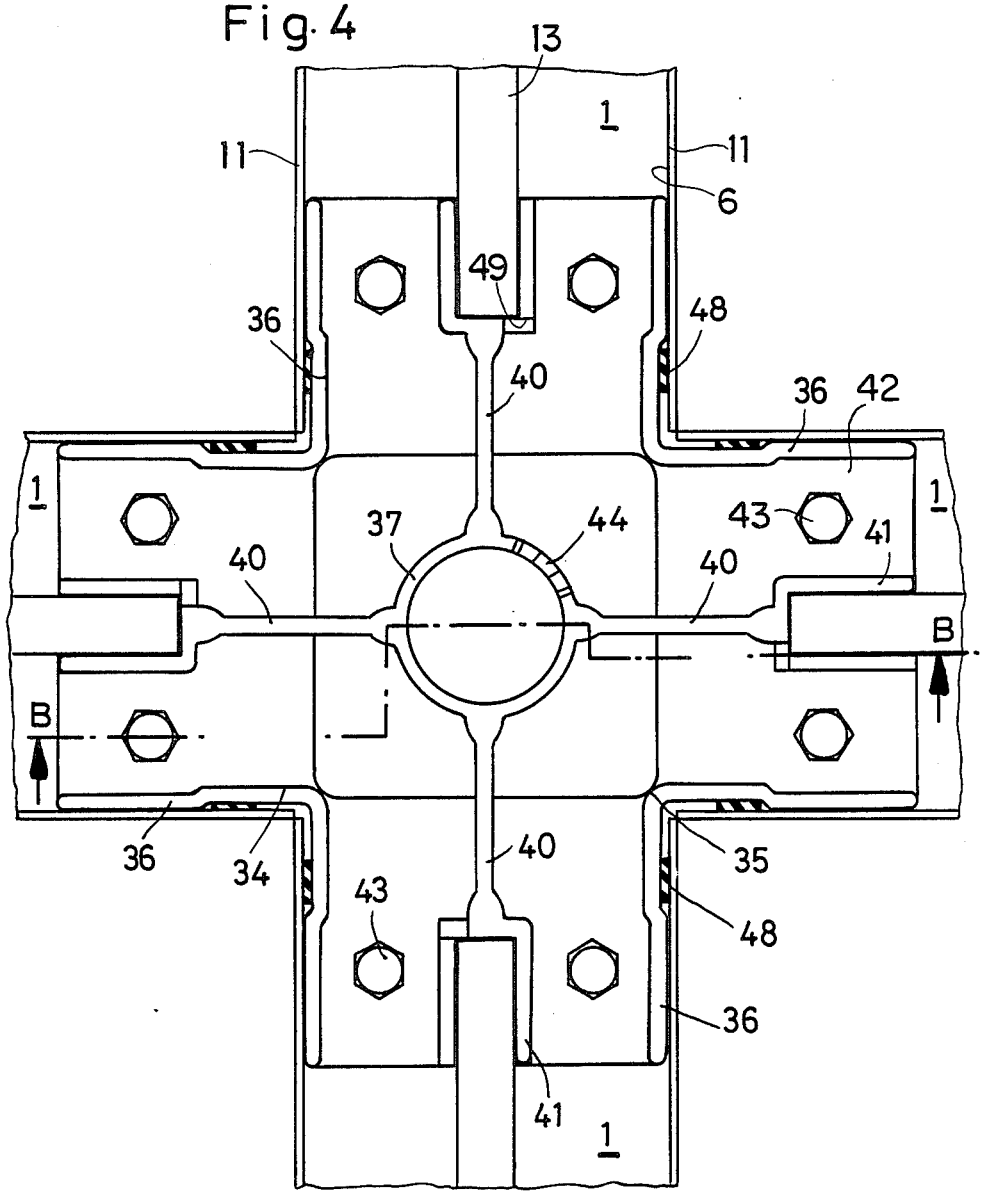

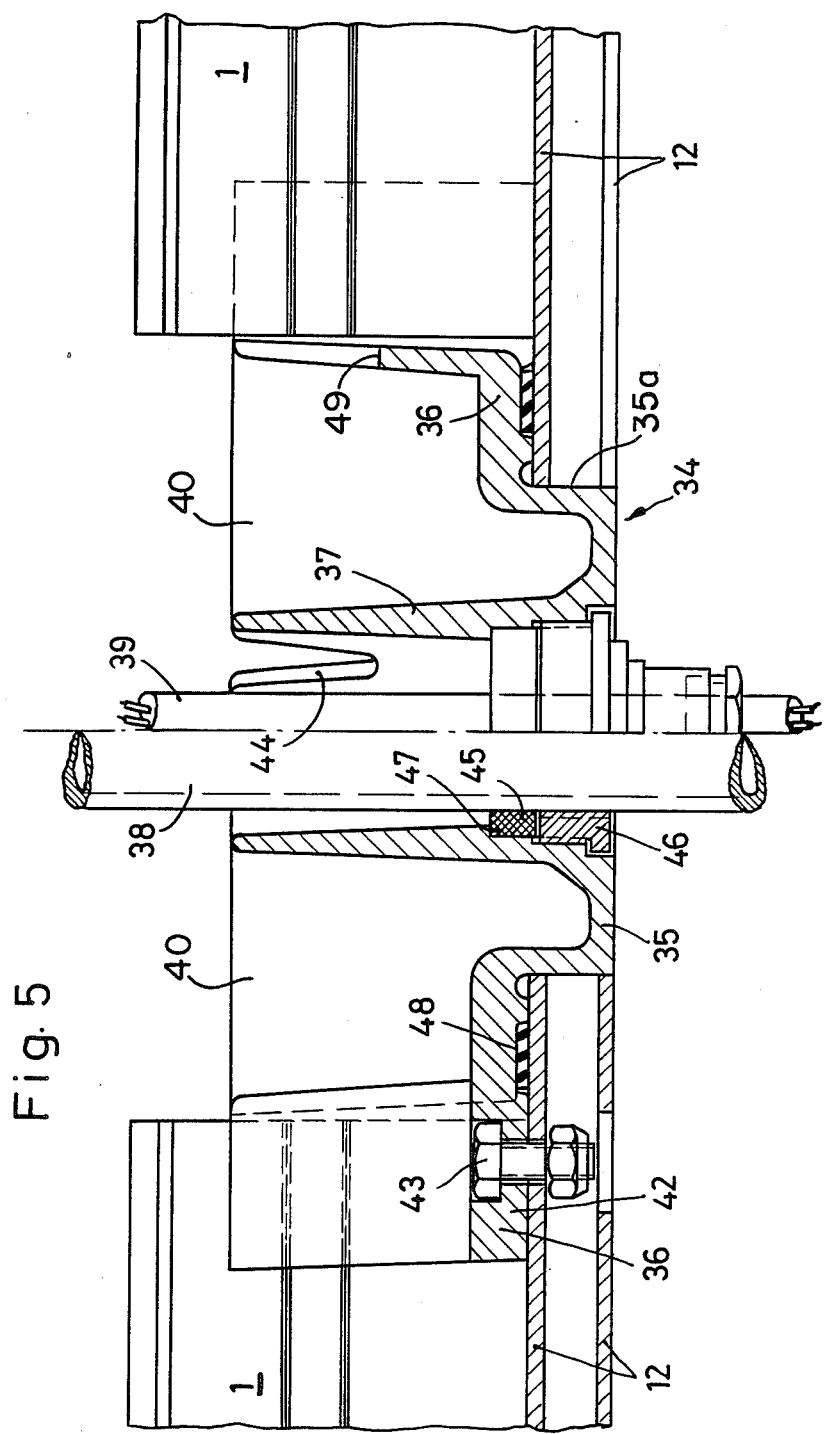

SUSPENDABLE MODULAR FRAME ARRANGEMENT FOR CLEAN ROOM CEILINGS HAVING A FLUID SEAL

The invention relates to a modular frame arrangement suspendable from the ceiling of a room for receiving filters having a fluid seal for clean room ceilings according to the preamble of the main claim.

For various production facilities in industry, for example in the manufacture of integrated circuit components, extremely strict conditions are imposed on the cleanliness of the production rooms. In order to fulfill these conditions, filter ceilings have been developed in which a plurality of mechanical filters, each received in a frame, are arranged adjacent one another as a suspended ceiling, the air being introduced between the original ceiling and the suspended ceiling and removed again at the floor. In this connection, the filters are secured on a suspended frame arrangement consisting of structural rails. Particularly in order to seal also the intermediate spaces between the individual filters against the passage of aerosols, the so-called fluid seal is used in the state of the art. For use of this fluid seal, the frame arrangement according to the state of the art consists of U-section rails which are assembled together to form a grid-like frame structure with the aid of cross members, T members and angle members. Into the U-section channels, is admitted a liquid of low viscosity or a liquid which solidifies at room temperature, for example vaseline or silicone grease. This fluid serves as a barrier against the access of dust to the connection positions between the filters and the ceiling frame. The mechanical filter is provided with a periphery skirt, for example of aluminum sheet, which is immersed in the fluid so that a particle-tight seal is ensured against the clean room side.

From European Patent Application No. 0 116 772 a frame arrangement of this type is known in which the U-section rails are inserted into correspondingly constructed cross members, T members and angle members and are connected to these, for example by means of rivets. The connection members have suspension bolts for suspending the ceiling. In such a frame arrangement, many disadvantages may be perceived. The fluid channels of the whole frame arrangement communicate with one another. This leads to great difficulties upon filling with fluid, since there is no control of the full condition in the channels lying remote from the filling position. Since the fluid channels are constructed as simple U-section rails from bent aluminium sheet, the resistance moment in the x and y directions is low so that the stability of the overall frame arrangement is not very large. The U-section rails are unsuitable for securing components such as walls, cable channels or light fittings, since the securing elements can push through the walls of the rails, whereby the sealing fluid can flow or drop through so that the clean room is contaminated. The suspension of the frame arrangement employs only the connection members between the rails so that these connection members are all carrying components. The raster dimension must therefore be transferred very exactly to the original ceiling which is associated with great difficulties and is almost impossible. The ceiling construction can be aligned only with great expense in this type of suspension, so that often the ceiling elevation fails to satisfy requirements in the architectural sense. Since the rails are inserted into the connection members, a height offset results so that the lower edge of the ceiling is uneven.

In the state of the art, a further frame arrangement is known in which the U-section rails are replaced with E-section rails. The central web thus divides the fluid channels in such manner that an individual channel is assigned to each filter so that filling is easier. The suspension is carried out by means of holes bored in the central web and transverse bolts, the alignment being difficult also here since no displaceability of the suspension is provided. The rails are slid on one another for the transverse connection, the corners being connected by angle members. Sealing against the escape of the fluid is not ensured at these connection positions. The remaining disadvantages described above apply also to this arrangement.

The invention is based on the object of providing a modular frame arrangement suspendable from the ceiling for receiving of filters having a fluid seal for clean room ceilings which has great stability and which enables securing both of light components, such as flow skirting and also of heavy components such as walls or light fittings, sealing against the escape of the fluid being ensured.

This object is achieved according to the invention by the characterising features of the main claim in combination with the features of the preamble.

According to the invention, the webs of the structural rails lying parallel to the ceiling are constructed as hollow sections, whereby the stiffness of the entire frame arangement is improved. The hollow section permits securing of components by means of screws or rivets onto the lower side of the structural rails without penetrating the floor of the fluid channel, so that sealing against the escape of the fluid from the fluid channel remains ensured. The stiffness is further increased by constructing the hollow section of the web in the form of two hollow chambers and a T-section groove lying between these hollow chambers, the hollow chambers serving for securing of small light components by means of blind rivets or self-tapping screws and the T-groove arranged therebetween for receiving self-locking hammerhead screws which can be used as arbitrarily positionable securing members for large heavy components.

In a further development of the invention, the central web of the rails is likewise constructed as a hollow section, whereby the stiffness of the frame arrangement in the y direction is increased so that insepctions are possible without permanent deformation. In a further development, the central web ends in a solid head which is provided with laterally arranged grooves. By means of these grooves, which extend over the entire length of the rails, the suspension which engages in the grooves can be positioned arbitrarily along the length of the rails. By forming the upper surface of the head as a hollow channel, the suspension becomes more secure since the clamping screw of the suspension arrangement can be clamped to be secure against loosening.

According to the invention, the connection member connecting the structural rails is constructed as a square central part with integral arms, a tube connector being provided in the center of the central part and the lower connection surface of the central part lying lower than the lower connection surface of the arms. By means of this construction, after insertion of the arms into the rails a flush lower side of the frame arrangement is provided, the tube connectors ensuring trouble-free guidance of sprinkler conduits or electrical conduits. In a further development of the invention, the arms are provided with a central web which ends on the tube support and which is forked on the opposite end for receiving the central web of the rail. By provision of a groove in the tube connector after guiding through of the conduits and after introduction of the fluid, which also runs in the space between the conduit and the inner wall of the tube connector, trouble-free sealing is obtained for the passage, downward leaking of the fluid being prevented by a sealing ring. The construction according to the invention of the connection member ensures very good dimensional consistency and angularity of the structural rail raster, good sealing being moreover obtained at the crossing points.

By the use of extruded aluminium with anodized surfaces as material for the structural rails and the connection members, self-generation of particles, for example by corrosion, is excluded, the capacity for diverting electrostatic charges being maintained.

Further advantages result from the structures set forth in the claims.

The invention is illustrated in the drawing and will be explained in more detail in the following description. In the drawings:

FIG. 2 shows a section through a structural rail according to the invention;

FIG. 3 shows a representation of the suspension of the structural rail;

FIG. 4 shows a view of a connection member for structural rails;

FIG. 5 shows a section through a connection member along the section line B—B of FIG. 4;

Figure 1:
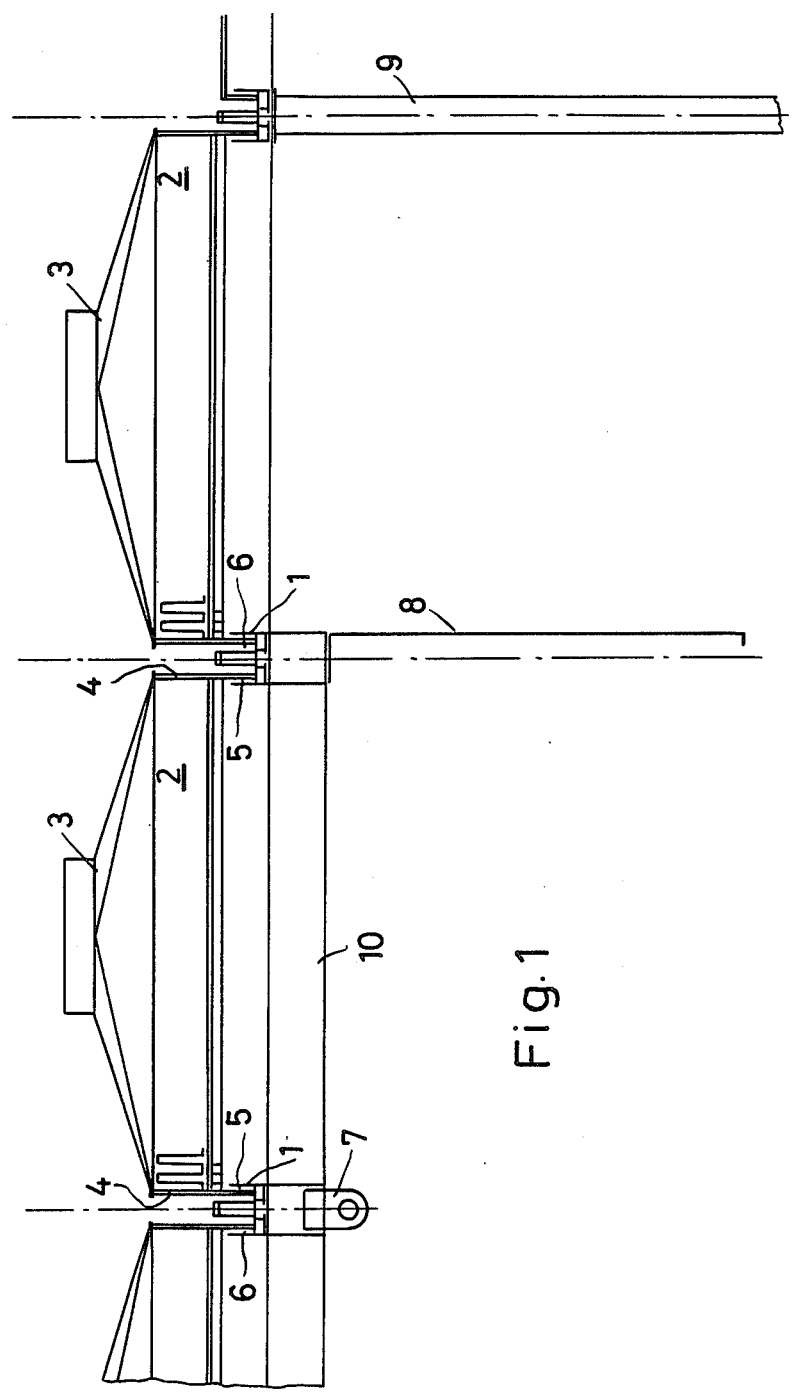
FIG. 1 shows a simplified elevational view of a clean room ceiling.

FIG. 1 shows the assembly of a clean room ceiling which consist of a frame arrangement comprising structual rails 1 and mechanical filters 2. The rails are connected with the normal ceilng by suspension devices which are not illustrated. Above the mechanical filters 2, inlets 3 for the air are illustrated. The mechanical filters 2 are received in frames 4 on which peripheral skirts 5 are secured. The skirts extend into U-section channels 6 of the rails 1 which contain a fluid which is not illustrated. On the structural rails 1, lamps 7, flow skirting 8 or even walls 9 are secured directly or via profiled members. Intermediate ceilings 10 are schematically illustrated which likewise are secured to the rails 1. In FIG. 2, the structural rail 1 used for the ceiling frame arrangement is illustrated in more detail. The rail 1 has two lateral flanges 11 and a web 12. Centrally of the lateral flanges, a central web 13 is provided. The web 12 is constructed as a hollow section and has two lateral hollow chambers 14 and a centrally arranged T-section groove 15 provided between these. Also the central web 13 is constructed as a hollow section, its walls 16 extending somewhat obliquely upwards. The central web 13 extends beyond the lateral flanges 11 and ends in a head 17 in which laterally formed grooves 18 are provided. The upper surface 19 of the head 17 is formed as a hollow recess. The web 13 is provided laterally with filling marks 20 which each face inwardly of the U-section channels formed by the flanges 11, the web 12 and the central web 13.

In FIG. 3, the installation and suspension of the rail 1 is illustrated, fluid 21 being filled in the U-section channels 6. The frames 4 merge directly into the peripheral skirts 5 which are dipped into the fluid 21, the skirts lying on the inner side of the web 12 and thus forming the holder for the filters 2.

The rail 1 is suspended by its head 17 by means of a suspension device 22 which has two angle members 23, 24 forming a clamp. The angle members 23, 24 engage in the grooves 18.

A bolt 25 is introduced through the angle members 23, 24 and is clamped by means of nuts 26 and/or a screw block onto the upper surface 19 of the head 17 formed as a hollow recess, the clamping effect of the angle members 23, 24 being simultaneously generated. The bolt 25 is suspended by an eye 27 on a hook 28 connected to the ceiling.

FIG. 3 shows further a possibility for securing components on the web 12 of the rail. In this connection, a profiled member 29 is secured by means of self-tapping screws 30 provided in the T-groove 15, an intermediate ceiling 31 and, via further screw connections 32, a lamp 33 being secured to the profiled member 29 in this exemplary embodiment. Of course, the profiled member 29 serving as an intermediate member is not absolutely necessary so that for example the lamp 33 can be directly held on screws received in the T groove 15.

In FIGS. 4 and 5, a connection member 34 for the rail 1 is illustrated. The connection member 34 is constructed in this embodiment as a cross member but however also T-section and other angular members can be constructed in the same manner. The connection member 34 consists of a central part 35 and integral arms 36 extending outwardly from the cental part with their longitudinal center lines projecting at appropriate angles from the center part 36. In the FIG. 4, the cruciform connection number 34 has a square central part 35 and four arms 36, one extending outwardly from each side of the square. In the present case, a height difference exists between the lower surface of the central part 35 and the lower surface of the arms 36 which corresponds to the height of the web 12 of the rail 1. This difference in height provides upright abutment surfaces 35a between the lower surfaces of the arms 36 and the lower surface of the central part 35. The upright abutment surfaces are disposed at right angles to the respective center lines of the arms. In the center of the central part 35 is provided a tube connector 37 which serves for the passage of conduits, such as sprinkler conduits 38 or electrical conduits 39. Corresponding to the central web 13 of the rail 1, also the connection member 34 is provided with central webs 40 which however are solid. The central webs 40 merge into the tube connectors 37 and are formed on the open end of the arms 36 as a fork 41. The connection member 34 has channels which open upwardly between lateral flanges so that the U-section channels 6 formed by the rails 1 can be extended by the connection member 34 around corners. For this purpose, the connection members 34 are inserted in the rails 1, the central webs 13 of the rails 1 being received in the corresponding fork 41. The flanges 11 of the rails and the webs 12 extend across the central web 13 and engage against the abutment surfaces 35a which surround the central part 35 of the connection member 34. Between the inner side of the web 12 of the rail and the outer surface of the arms, is inserted a U-section sealing strip 48 which serves for sealing against escape of the fluid 21. The base 42 of the arms 36 is in each case connected to the web 12 of the associated rail on both sides of the central web 40 of the fork 41 by means of a rigid screw connection 43, whereby a uniform pressure is applied so that the arms 36 are not twisted in the rail 1.

In the tube connector 37, is provided a groove 44 so that upon filling with the fluid this can also reach the interior of the tube connector.

A corresponding groove 49 is provided in the fork so that the space between fork 41 and central web 13 of the rail 1 can be filled. For sealing relative to the clean room, the sealing ring 45 is arranged around the conduit 38 or 39 which passes through, which sealing ring for example is pressed by a screw socket 46 operable from the clean room against a shoulder 47 provided within the tube connector 37.

Figure 6:
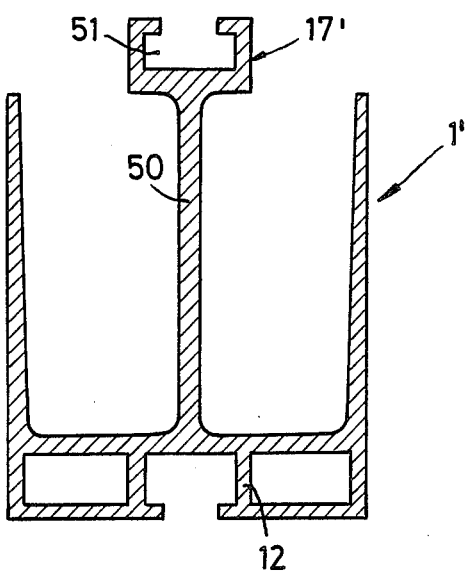
FIG. 6 shows a section through a further embodiment of the structural rail.

FIG. 6 shows a further exemplary embodiment of the rail 1' which is narrower as a whole than the exemplary embodiment according to FIG. 2 and whose central web 50 is solid. Also the construction of the head 17' of the central web is modified relative to the exemplary embodiment according to FIG. 2. The head 17' has a T-section groove 51 which corresponds to the T-section groove 15 of the web 12 of the rail 1 extending parallel to the ceiling, in which groove 51 correspondingly formed screws can be inserted on which the suspension device can be secured.

Figure 7:
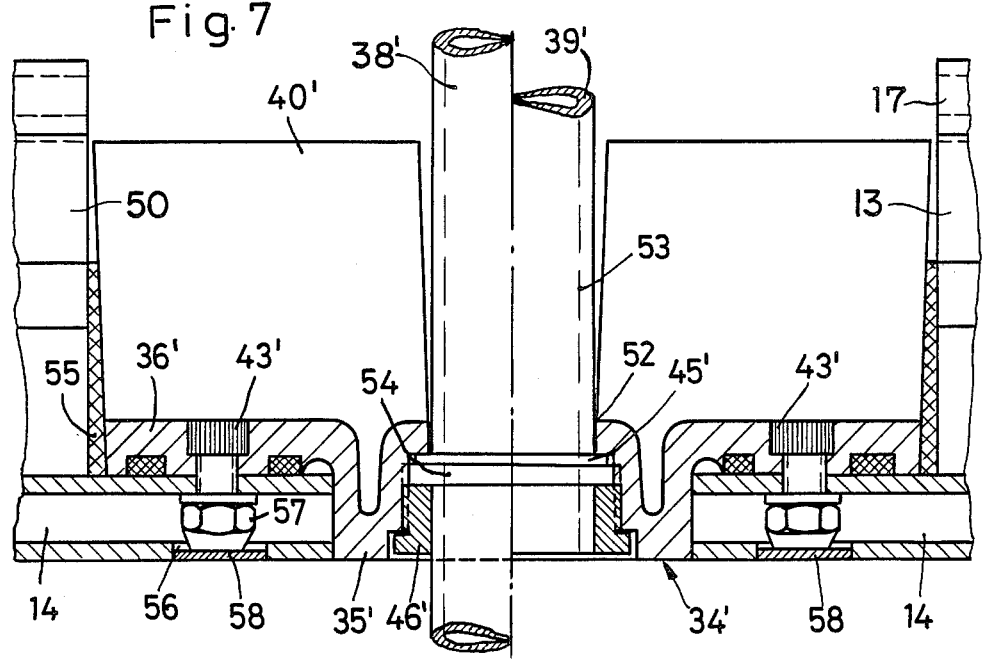
FIG. 7 shows a section through a further embodiment of the connection member.

In FIG. 7 a further exemplary embodiment for the connection member 34' is illustrated. The connection member 34' consists, corresponding to that according to FIG. 5, of a square central part 35', a simple bore 52 being provided centrally of this central part, through which the conduits 38', 39' are guided. For the electrical conduits 39', an empty tube 53 must in addition be provided which receives the electrical conduits. The sprinkler tube 38' or the empty tube 53 is outwardly provided with a clamping 54 which serves as a stop and which can be tightened by means of a threaded socket 46' from the clean room side. In this connection, a sealing ring 45' can be interposed. The central webs 40' of the connection member 34' end on the one hand at the bore 52 and on the other hand at the ends of the arms 36' are formed without forking as in FIGS. 4 and 5, so that between the central webs 13, 50 of the rails and those of the connection members 34' a small intermediate space 55 is created. This intermediate space receives fluid after filling of the fluid which rapidly solidifies upon filling. In this exemplary embodiment, the screws 43' are direclty sealing secured in the connection member 34' by pressing, casting or adhesion so that they are connected in one piece with the connection member. After screwing of the connection member to the rails, the access holes 56 for the nuts 57 of the screws are sealed with caps 58 for example of synthetic material, whereby the hollow chambers 14 of the rails 1 are closed relative to the clean room side.

In the event that no sprinkler pipes 38' or conduits 39' in empty tubes 53 need be guided through the connection member 34', dummy tubes are inserted in the bores 52 of the connection member 34' which are closed relative to the clean room side so that the individual fluid channels are mutually closed.

We claim:

1. Modular frame arrangement for clean room ceilings suspendable from the ceiling of a room for receiving filters comprising: a sealing fluid; at least two structural rails intersecting at a given angle to each other and each having U-section channels facing up for receiving the fluid and provided with a lower web having at least one hollow chamber extending longitudinally of the rail and an upstanding central web; and an angular connection member for connecting the structural rails comprising a central part having a tube guide passing from the top to the bottom therethrough, and at least two arms integrally formed to project out laterally from said central part at said given angle to each other, each arm having an upwardly-facing channel for said sealing fluid, said channels of the arms being interconnected to interconnect said U-section channels of the intersecting rails, the lower surfaces of the arms being offset upwardly from the lower surface of said central part to form upright abutment surfaces, said arms being engaged in the U-section channels of said rails respectively so that the ends of said lower web hollow chambers confront said abutment surfaces.

2. Frame arrangement according to claim 1 wherein each said lower web is provided with two longitudinal hollow chambers and a T-section groove lying between said hollow chambers.

3. Frame arrangement according to claim 1 wherein the upstanding central webs of the rails are constructed with longitudinally extending hollow chambers.

4. Frame arrangement according to claim 1 wherein the central web of each rail projects upwardly beyond the U-section channels thereof and ends in a solid head which is provided with lateral grooves extending longudinally of the rail.

5. Frame arrangement according to claim 4 including a hollow recess in the surface of the head directed towards the room ceiling.

6. Frame arrangement according to claim 1 including indicia on the central web constituting filling marks for said sealing fluid.

7. Frame arrangement according to claim 1 wherein said rails intersect at right angles to each other, and the connection member has a square central part, said tube guide being arranged in its center, said abutment surfaces and said arms being disposed at right angles to each other.

8. Frame arrangement according to claim 1 wherein the tube guide projects upwardly from the upper surface of said central part, each of the arms having a central web extending longitudinally from the tube guide and ending in a fork.

9. Frame arrangement according to claim 1 including sealing strips mounted between the inner surfaces of the U-section channels of the rails and the outer surfaces of the arms of the connection member.

10. Frame arrangement according to claim 8 wherein the central web of each rail is engaged in the fork of its associated arm, the end of the lower web of the rail extending along the lower surface of said arm beyond the end of the central web of said rail.

11. Frame arrangement according to claim 1 wherein the offset between the lower surface of the central part and the lower surface of each arm provides an upright abutment surface which corresponds to the height of the lower web of the rail.

12. Frame arrangement according to claim 1 wherein the guide tube has a central passage constructed for the passage of conduits, and including a seal adapted for mounting between the conduits and the tube passage.

13. Frame arrangement according to claim 12 wherein the passage has a circumferential shoulder and the seal comprises a ring adapted to surround said conduit, and a threaded socket adapted to press said seal ring against said shoulder in the tube passage.

14. Frame arrangement according to claim 13 wherein the tube connector projects upwardly from the upper surface of said central part and has means affording a groove for the entry of the fluid into the interior passage of the tube guide above said seal ring.

15. Frame arrangement according to claim 1 wherein said rails and said connection members consist of extruded aluminum with anodized surfaces.

16. Frame arrangement according to claim 1 wherein the tube guide comprises a bore through said central part adapted to receive sprinkler tubes or empty tubes, the arms having central webs aligned with the central webs of the rails and extending from said webs toward said tube guide and ending at the bore.

17. Frame arrangement according to claim 1 wherein the the central web of the rail projects upwardly beyond the U-section channels thereof and is formed at its upper end with a longitudinal T-section groove.

* * * * *